United States Patent
Wang et al.

(10) Patent No.: US 11,475,925 B2
(45) Date of Patent: Oct. 18, 2022

(54) PROTECTIVE CASE FOR A HARD DISK DEVICE BASED ON BLOCKCHAIN

(71) Applicant: Anqing Normal University, Anhui (CN)

(72) Inventors: Yuanzhi Wang, Anhui (CN); Zizhen Shi, Anhui (CN); Xin Zheng, Anhui (CN); Zhong Huang, Anhui (CN); Juan Liu, Anhui (CN); Zhouping Yin, Anhui (CN)

(73) Assignee: Anqing Normal University, Anqing (CN)

( * ) Notice: Subject to any disclaimer, the term of this patent is extended or adjusted under 35 U.S.C. 154(b) by 0 days.

(21) Appl. No.: 17/670,240

(22) Filed: Feb. 11, 2022

(65) Prior Publication Data

US 2022/0165310 A1    May 26, 2022

Related U.S. Application Data (63) Continuation of application No. PCT/CN2021/085908, filed on Apr. 8, 2021.

(30) Foreign Application Priority Data

May 22, 2020    (CN) .......................... 202010439831.4

(51) Int. Cl.
  *G11B 33/14*    (2006.01)
  *G11B 33/02*    (2006.01)

(52) U.S. Cl.
  CPC ........ *G11B 33/1446* (2013.01); *G11B 33/027* (2013.01)

(58) Field of Classification Search
  None
  See application file for complete search history.

(56) References Cited

U.S. PATENT DOCUMENTS 7,242,580 B1 *   7/2007   Tanaka ............... H05K 7/20736
                                                    361/679.48
7,486,526 B1 *   2/2009   Frangioso, Jr. ...... G11B 33/128
                                                    361/756

(Continued)

FOREIGN PATENT DOCUMENTS

CN        104731273 A      6/2015
CN        205680906 U     11/2016

(Continued)

OTHER PUBLICATIONS

International Search Report of PCT/CN2021/085908.
Written Opinion of PCT/CN2021/085908.

*Primary Examiner* — William J Klimowicz
(74) *Attorney, Agent, or Firm* — Dragon Sun Law Firm, PC; Jinggao Li, Esq.; Nathaniel Perkins (57) ABSTRACT

The present invention belongs to the technical field of hard disk device, and specifically relates to a Hard Disk Device Based on Blockchain. The hard disk device comprises a storage unit and a protection unit; wherein a hard disk body stores information in the blockchain; the protection unit comprises a protective case, an airbag and an interface extension board; the airbag is laid flat on the inner bottom of the protective case; the interface extension board passes through a side wall of the protective case and is bolted to the protective case; a dust board in a first through hole of the interface extension board is located at the port on the interface extension board close to the hard disk body when the hard disk body is not placed in the protective case; the dust board is connected to the inside of the first through hole by a first spring.

4 Claims, 8 Drawing Sheets

(56) References Cited

U.S. PATENT DOCUMENTS

2005/0013110 A1    1/2005   Shah et al.
2019/0103697 A1*   4/2019   Amini ................ H01R 13/6585
2020/0176920 A1*   6/2020   Jo ........................ H01R 13/405

FOREIGN PATENT DOCUMENTS

| CN | 107767890 A | 3/2018 |
| CN | 207833918 U | 9/2018 |
| CN | 208707364 U | 4/2019 |
| CN | 111681686 A | 9/2020 |

* cited by examiner

PROTECTIVE CASE FOR A HARD DISK DEVICE BASED ON BLOCKCHAIN

CROSS-REFERENCE TO RELATED APPLICATIONS

This application is a bypass continuation application of PCT application no.: PCT/CN2021/085908. This application claims priorities from PCT Application PCT/CN2021/085908, filed Apr. 8, 2021, and from Chinese Application CN202010439831.4, filed May 22, 2020, the contents of which is incorporated herein in the entirety by reference.

FIELD OF THE INVENTION

The present invention belongs to the technical field of hard disk devices, and particularly relates to a Hard Disk Device Based on Blockchain.

BACKGROUND OF THE INVENTION

Blockchain is a term used in the field of information technology. It is essentially a shared database for storing data or information, which are featured by "Unforgeability", "Whole-course Trace", "Traceability", "Openness and Transparency" and "Collective Maintenance". Blockchain contains information stored in the network. To find the required information in time, people usually download it from the network and store in a disk.

To consult the information stored in a disk, users usually insert the disk into the hard drive slot for reading the contents containing in it. However, when the hard disk device is not used, external dust easily enters the hard disk slot and accumulate for a long time, which affects the reading rate of the device, thus reducing the service time of the hard disk device.

In the prior art, a blockchain-based hard drive device disclosed in the application (application No.: 2018207465658) solves the problem that external dust easily accumulates for a long time in the hard drive slot, thus affecting the reading rate of the device and reducing the service life of the hard drive device. However, some facts are neglected. For example, the hard drive, as a precision storage disk, shall be safe against a destructive force of external vibration. In addition, when a connecting line is repeatedly connected to the hard disk interface, the connector will rub against the hard disk interface, resulting in the wear of the hard disk interface and the connector of connecting line; in this case, a new connecting line shall be used, and the hard disk interface that cannot be replaced needs to be protected.

In view of this, a special Hard Disk Device Based on Blockchain has been designed and developed to solve the above technical problems.

SUMMARY OF THE INVENTION

To make up for the shortcomings of the prior art and solve the problems described in the background art, the present invention provides a Hard Disk Device Based on Blockchain.

A technical solution for solving the technical problem of the present invention is a Hard Disk Device Based on Blockchain, comprising a storage unit and a protection unit; wherein the storage unit comprises a hard disk body used for storing information on the blockchain and arranged in the protection unit; the protection unit comprises a protective case, an airbag and an interface extension board; the airbag is laid flat on the inner bottom of the protective case and affixed to the hard disk body from above; the side wall of the hard disk body in the length direction is affixed to the inner side of the protective case, and an interface thereon is inserted into the interface extension board; the interface extension board passes through a side wall of the protective case and is bolted to the protective case; when the hard disk body is not placed in the protective case, a first through hole is made on the interface extension board to accommodate a dust board that is arranged close to the hard disk body; the dust board is connected to the inside of the first through hole by a first spring; a plurality of second through holes are made on the dust board and interspersed with copper bars, one end of the copper bars is shaped into a letter "L", and both ends thereof are located at two ends of the interface extension board, respectively; the hard disk body is protected from dust through the cooperation between the protection unit and the dust board. The interface of the hard disk body wears out after a frequent use, as a result, the stable connection between the interface of the hard disk body and the connector of the connecting line can be affected. To this end, an interface extension board is arranged at the interface of the hard disk body as a replacement of the interface. When the hard disk body is not placed inside the protective case, the first through hole of the interface extension board will be blocked by the dust board for dust prevention. The hard disk body is placed in the protective case, during which the interface of the hard disk body is inserted into the first through hole of the interface extension board, and an interface end of the hard disk body presses down on the dust board, which squeezes the first spring into the first through hole and affixes the copper bar to the interface of the hard disk body. To use the hard disk body, the connector of the connecting line is simply inserted into the interface extension board and connected to the interface of the hard disk body through the copper bar, thus avoiding the wear and tear as well as the unstable connection of the interface of the hard disk body that is directly connected to the connector of the connecting line.

Preferably, arc-shaped pressing plates are arranged in the first through hole, with the number of pressing plate the same as that of the copper bars. One end of the pressing plates is located at the L-shaped end of the copper bars, the middle position thereof is hinged to the side wall of the first through hole, and the pressing plates pass through a third through hole formed on the dust board. The connective stability of the copper bars and the interface of the hard disk body is further enhanced through the cooperation between the pressing plate and the dust board. In use, when the interface end of the hard disk body presses down on the dust board, the dust board will slide along the inner wall of the first through hole to the middle position, the side wall of the third through hole will squeeze one end of the pressing plate upward, making the pressing plate rotate around the hinge point, and then the other end of the pressing plate will move downward to press the copper bar on the interface of the hard disk body, so as to enhance the stability between the copper bar and the interface of the hard disk body, and avoid the detaching of the copper bar from the interface of the hard disk body due to external vibration.

Preferably, a first tube is installed in the airbag, and the outlet end thereof is connected to a plurality of air nozzles that are fixedly connected to one end of the interface extension board close to the hard disk body in a row, and extend through the interface extension board into the first through hole. The copper bar inside the first through hole and the interface of the hard disk body are dedusted through the cooperation between the airbag, the first tube and the air nozzle. To place the hard disk body in the protective case, the hard disk body presses down on the airbag to inject air via the air nozzle by means of the first tube, and then the air impacts the interface between the first through hole and the hard disk body, blowing the dust off the first through hole and the interface of the hard disk body. Now that no dust sticks to the copper bar and the interface of the hard disk body, the connective stability of the copper bar and the interface of the hard disk body will be not affected.

Preferably, a fastening unit is arranged opposite to an interface extension board in the protective case, and comprises a first plate, a threaded rod, a trapezoidal block and a push plate. Two ends of the push plate are embedded into a sliding block arranged on the side wall of the protective case, one side face of the push plate is connected to one end of the sliding block through a second spring, and the other side face thereof is affixed to an inclined surface on the trapezoidal block. The threaded rod is in threaded connection with the first plate, one end of the threaded rod is hinged to the upper end face of the trapezoidal block, and the other end thereof passes through the first plate fixedly connected to the side wall of the protective case. The hard disk body is further fastened in the protective case by the fastening unit. To make the hard disk body more stable in the protective case and remove it easily, when placing the hard disk body in the protective case, the interface of the hard disk body is inserted into the first through hole of the interface extension board; at the same time, the threaded rod is controlled to rotate downward on the first plate and press down on the trapezoidal block which then presses down on the push plate to squeeze the hard disk body into the protective case. When the protective case is subjected to external vibration, the airbag in the protective case will buffer part of the destructive force, and then cooperate with the push plate to further squeeze the hard disk body into the protective case, thus preventing the disconnection between the interface of the hard disk body and the copper bar.

Preferably, the copper bar is affixed to a support plate, and bumps are arranged on the front and rear side walls of the support plate and embedded into a first slot opened on the side wall of the first through hole. The copper bar extends out of the interface extension board through the cooperation between the support plate, the bumps and the first through hole. In use, the copper bar of the interface extension board repeatedly rubs against the connector of the connecting line; as a result, the copper bar may not be effectively connected to the connector. For this reason, the worn-out part shall be cut off before the copper bar extends out of the first through hole. The push plate presses down on the hard disk body to make the interface end on the hard disk body squeeze the support plate. The bumps on the support plate then slide along the inner wall of the first slot to drive the copper bar out of the first through hole. The worn-out part of copper bar is cut off while the remaining part is affixed to the connector of the connecting line, so that the hard disk body can be connected to the connector of the connecting line again.

Preferably, a friction block is fixedly connected to the L-shaped end of the copper bar for enhancing the connective stability of the copper bar and the interface of the hard disk body. In use, when the interface of the hard disk body stretches into the first through hole, the friction block on the copper bar is forced to press down on and rub against the interface of the hard disk body, which does not cause the wear and tear of the interface of the hard disk body but enhance the connective stability of the friction block and the interface of the hard disk body.

Technical effects and advantages of the present invention:

1. According to the Hard Disk Device Based on Blockchain of the present invention, when using the hard disk body, the connector of the connecting line is simply inserted into the interface extension board and connected to the interface of the hard disk body through the copper bar, thus avoiding the wear and tear as well as the unstable connection of the interface of the hard disk body that is directly connected to the connector of the connecting line.

2. According to the Hard Disk Device Based on Blockchain of the present invention, the interface end on the hard disk body squeezes the support plate and the bumps on the support plate then slide along the inner wall of the first slot to drive the copper bar out of the first through hole. The worn-out part of copper bar is cut off while the remaining part is affixed to the connector of the connecting line, so that the hard disk body can be connected to the connector of the connecting line again.

BRIEF DESCRIPTION OF THE DRAWINGS

The present invention will be further described in combination with drawings and embodiments.

In the figure: storage unit 1, hard disk body 11, protection unit 2, protective case 21, sliding block 211, second spring 212, airbag 22, first tube 221, air nozzle 222, interface extension board 23, first through hole 231, pressing plate 232, first slot 233, dust board 3, first spring 31, second through hole 32, copper bar 33, support plate 331, bump 332, friction block 333, third through hole 34, fastening unit 4, first plate 41, threaded rod 42, trapezoidal block 43, push plate 44.

DETAILED DESCRIPTION OF THE PREFERRED EMBODIMENTS

The present invention is further described with reference to the embodiments for a better understanding of the technical means, creative features, means and efficiency set forth herein.

Figure 1:
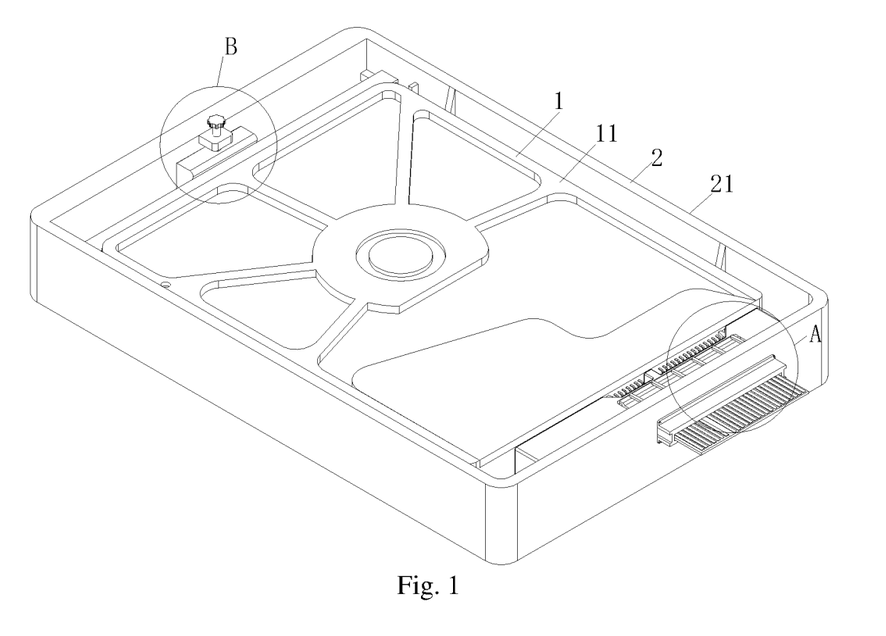
FIG. 1 is a perspective view of the present invention.
Figure 2:
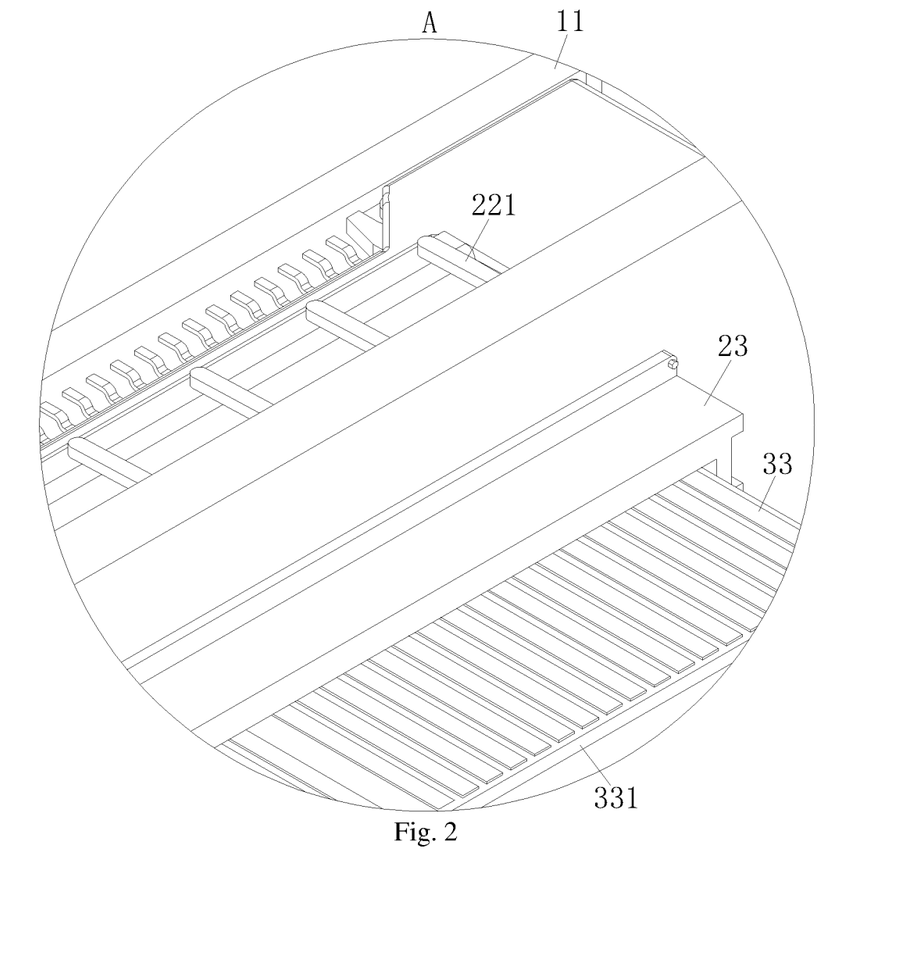
FIG. 2 is a local enlarged view of position A in FIG. 1.
Figure 3:
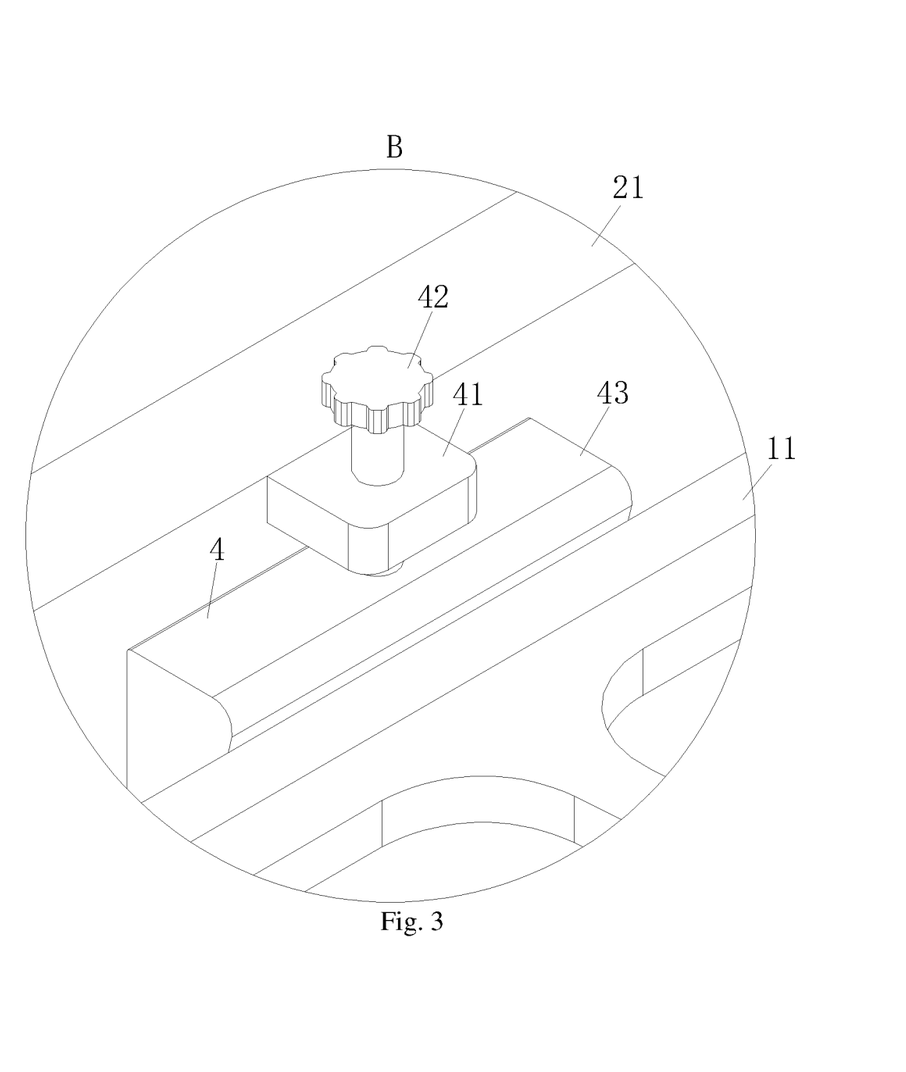
FIG. 3 is a local enlarged view of position B in FIG. 1.
Figure 4:
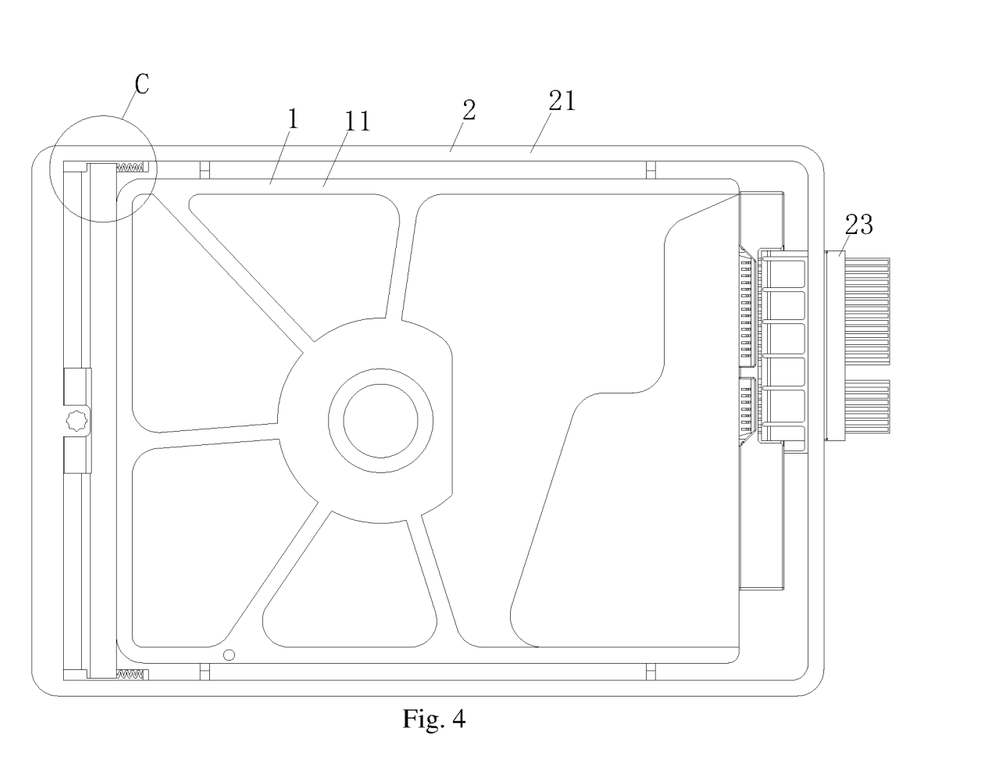
FIG. 4 is a top view of the present invention.
Figure 5:
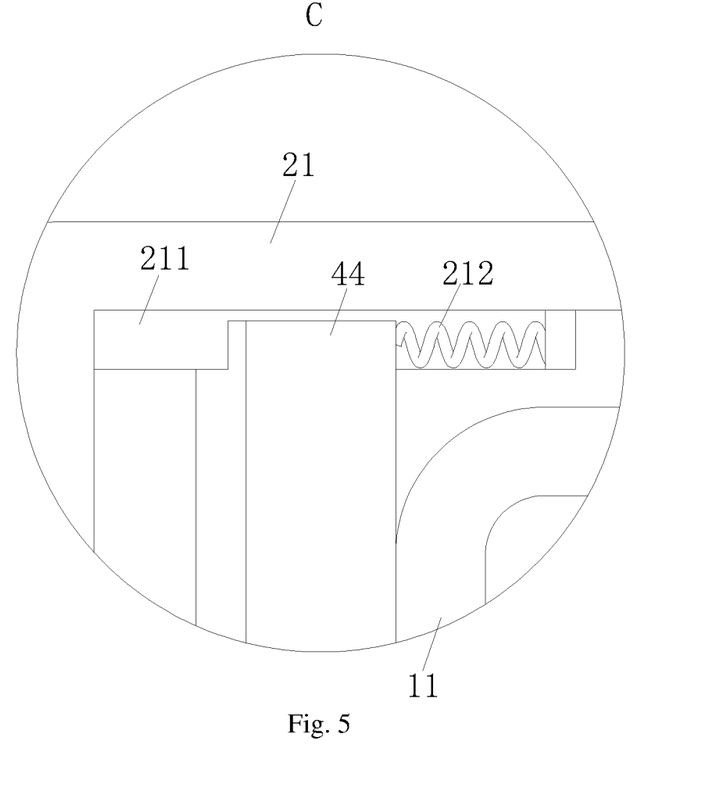
FIG. 5 is a local enlarged view of position C in FIG. 4.
Figure 6:
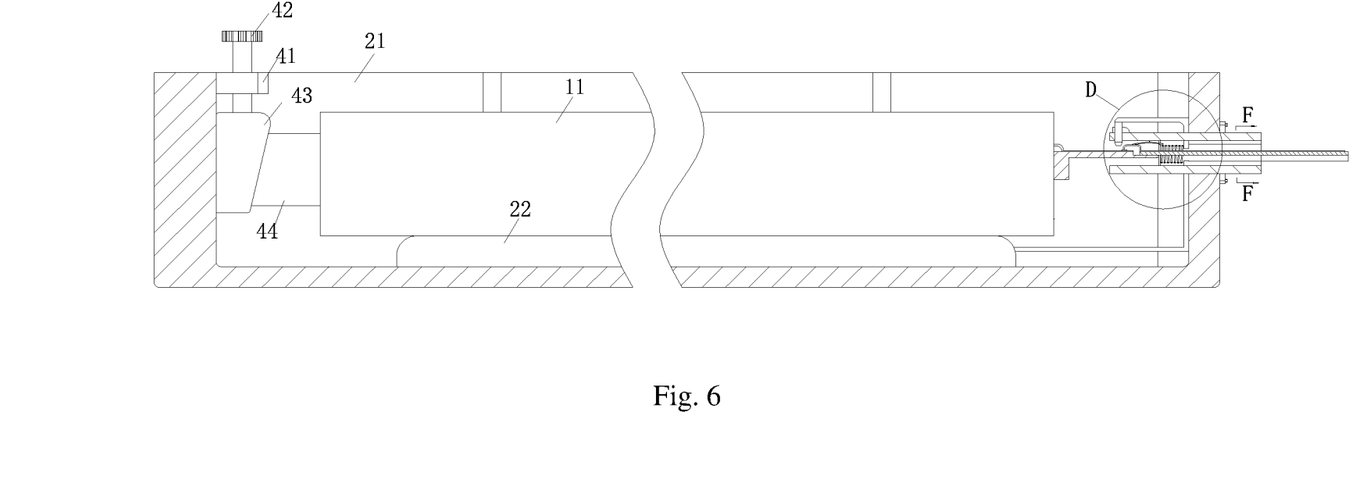
FIG. 6 is a section view of the present invention.
Figure 7:
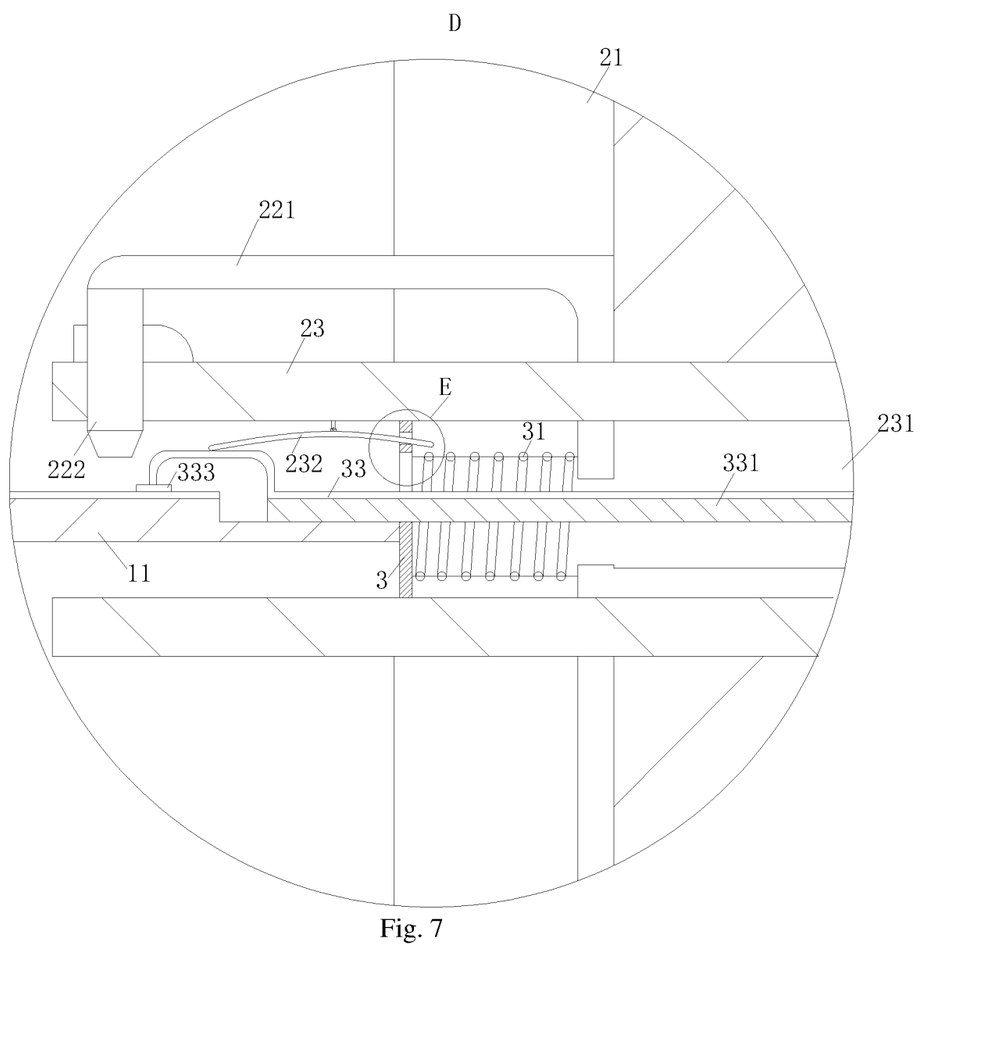
FIG. 7 is a local enlarged view of position D in FIG. 6.
Figure 8:
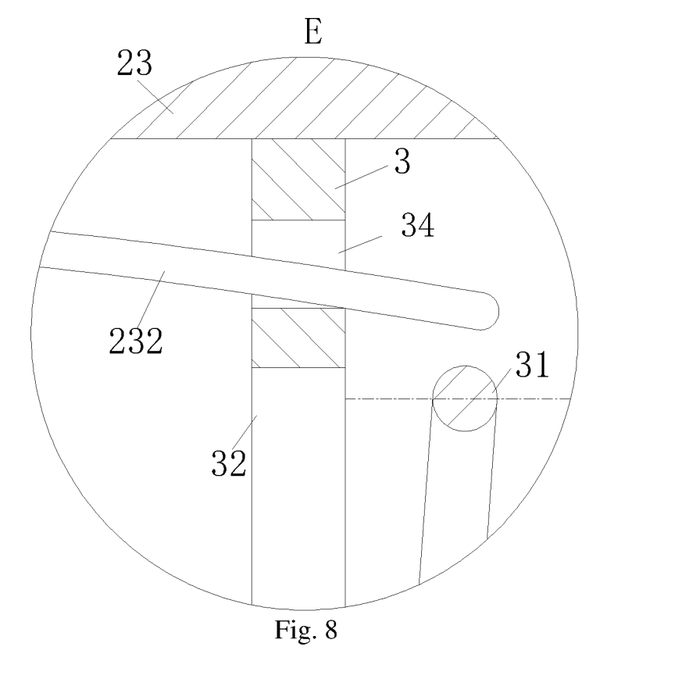
FIG. 8 is a local enlarged view of position E in FIG. 7.
Figure 9:
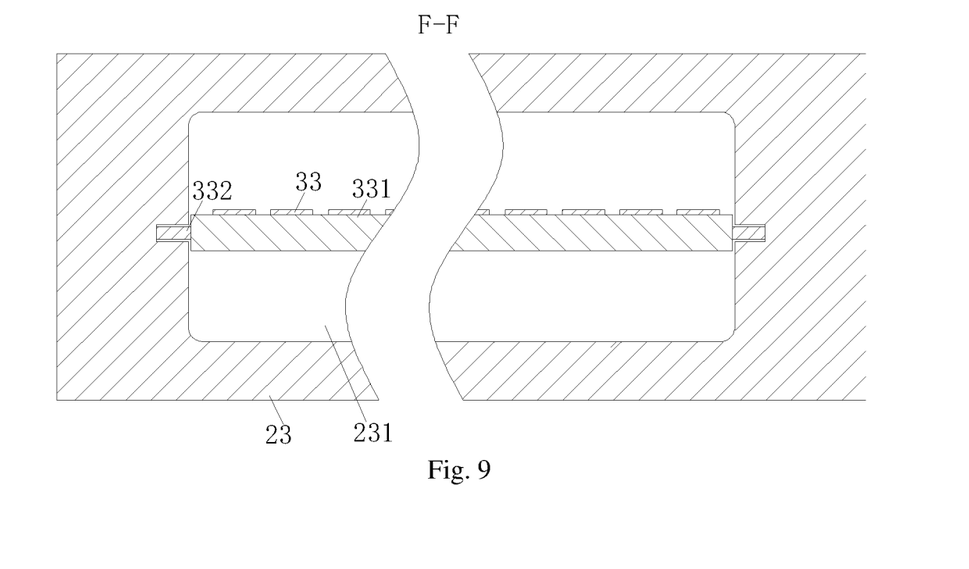
FIG. 9 is a section view at F-F in FIG. 6.

As shown in FIG. 1 to FIG. 9, a Hard Disk Device Based on Blockchain of the present invention comprises a storage unit 1 and a protection unit 2. The storage unit 1 comprises a hard disk body 11 used for storing information on the blockchain and arranged in the protection unit 2. The protection unit 2 comprises a protective case 21, an airbag 22 and an interface extension board 23. The airbag 22 is laid flat on the inner bottom of the protective case 21 and affixed to the hard disk body 11 from above. The side wall of the hard disk body 11 in the length direction is affixed to the inner side of the protective case 21, and an interface thereon is inserted into the interface extension board. The interface extension board 23 passes through a side wall of the protective case 21 and is bolted to the protective case 21. When the hard disk body 11 is not placed in the protective case 21, a first through hole 231 is made on the interface extension board 23 to accommodate a dust board 3 that is arranged close to the hard disk body 11. The dust board 3 is connected to the inside of the first through hole 231 by a first spring 31; a plurality of second through holes 32 are made on the dust board 3 and interspersed with copper bars 33, one end of the copper bars 33 is shaped into a letter "L", and both ends thereof are located at two ends of the interface extension board 23, respectively. The hard disk body 11 is protected from dust through the cooperation between the protection unit 2 and the dust board 3. The interface of the hard disk body 11 wears out after a frequent use, as a result, the stable connection between the interface of the hard disk body 11 and the connector of the connecting line will be affected. To this end, an interface extension board 23 is arranged at the interface of the hard disk body 11 as a replacement of the interface. When the hard disk body 11 is not placed inside the protective case 21, the first through hole 231 of the interface extension board 23 will be blocked by the dust board 3 for dust prevention. The hard disk body 11 is placed in the protective case 21, during which the interface of the hard disk body 11 is inserted into the first through hole 231 of the interface extension board 23, and an interface end of the hard disk body 11 presses down on the dust board 3, which squeezes the first spring 31 into the first through hole 231 and affixes the copper bar 33 to the interface of the hard disk body 11. To use the hard disk body 11, the connector of the connecting line is simply inserted into the interface extension board 23 and connected to the interface of the hard disk body 11 through the copper bar 33, thus avoiding the wear and tear as well as the unstable connection of the interface of the hard disk body 11 that is directly connected to the connector of the connecting line.

Furthermore, arc-shaped pressing plates 232 are arranged in the first through hole 231, with the number of pressing plate 232 the same as that of the copper bars. One end of the pressing plates 232 is located at the L-shaped end of the copper bars 33, the middle position thereof is hinged to the side wall of the first through hole 231, and the pressing plates 232 pass through a third through hole 34 formed on the dust board 3. The connective stability of the copper bars 33 and the interface of the hard disk body 11 is further enhanced through the cooperation between the pressing plate 232 and the dust board 3. In use, when the interface end of the hard disk body 11 presses down on the dust board 3, the dust board 3 will slide along the inner wall of the first through hole 231 to the middle position, the side wall of the third through hole 34 will squeeze one end of the pressing plate 232 upward, making the pressing plate 232 rotate around the hinge point, and then the other end of the pressing plate 232 will move downward to press the copper bar 33 on the interface of the hard disk body 11, so as to enhance the stability between the copper bar 33 and the interface of the hard disk body 11, and avoid the detaching of the copper bar 33 from the interface of the hard disk body 11 due to external vibration.

Furthermore, a first tube 221 is installed in the airbag 22 and the outlet end thereof is connected to a plurality of air nozzles 222 that are fixedly connected to one end of the hard disk body 11 close to the interface extension board 23 in a row, and extend into the first through hole 231 through the interface extension board 23. The copper bar 33 inside the first through hole 231 and the interface of the hard disk body 11 are dedusted through the cooperation between the airbag 22, the first tube 221 and the air nozzle 222. To place the hard disk body 11 in the protective case 21, the hard disk body 11 presses down on the airbag 22 to inject air via the air nozzle 222 by means of the first tube 221, and then the air impacts the interface between the first through hole 231 and the hard disk body 11, blowing the dust off the first through hole 231 and the interface of the hard disk body 11. Now that no dust sticks to the copper bar 33 and the interface of the hard disk body 11, the connective stability of the copper bar 33 and the interface of the hard disk body 11 will be not affected.

Furthermore, a fastening unit 4 is arranged opposite to an interface extension board 23 in the protective case 21, and comprises a first plate 41, a threaded rod 42, a trapezoidal block 43 and a push plate. Two ends of the push plate 44 are embedded into a sliding block 211 arranged on the side wall of the protective case 21, one side face of the push plate 44 is connected to one end of the sliding block 211 through a second spring 212, and the other side face thereof is affixed to an inclined surface on the trapezoidal block 43. The threaded rod 42 is in threaded connection with the first plate 41, one end of the threaded rod 42 is hinged to the upper end face of the trapezoidal block 43, and the other end thereof passes through the first plate 41 fixedly connected to the side wall of the protective case 21. The hard disk body 11 is further fastened in the protective case 21 by the fastening unit 4. To make the hard disk body 11 more stable in the protective case 21 and remove it easily, when placing the hard disk body 11 in the protective case 21, the interface of the hard disk body 11 is inserted into the first through hole 231 of the interface extension board 23; at the same time, the threaded rod 42 is controlled to rotate downward on the first plate 41 and press down on the trapezoidal block 43 which then presses down on the push plate 44 to squeeze the hard disk body 11 into the protective case 21. When the protective case 21 is subjected to external vibration, the airbag 22 in the protective case 21 will buffer part of the destructive force, and then cooperate with the push plate 44 to further squeeze the hard disk body 11 into the protective case 21, thus preventing the disconnection between the interface of the hard disk body 11 and the copper bar 33.

Furthermore, the copper bar 33 is affixed to a support plate 331, and bumps 332 are arranged on the front and rear side walls of the support plate 331 and embedded into a first slot 233 opened on the side wall of the first through hole 231. The copper bar 33 extends out of the interface extension board 23 through the cooperation between the support plate 331, the bumps 332 and the first through hole. In use, the copper bar 33 of the interface extension board 23 repeatedly rubs against the connector of the connecting line; as a result, the copper bar 33 may not be effectively connected to the connector. For this reason, the worn-out part of the copper bar 33 shall be cut off before the copper bar extends out of the first through hole 231. The push plate 44 presses down on the hard disk body 11 to make the interface end on the hard disk body 11 squeeze the support plate 331. The bumps 332 on the support plate 331 then slide along the inner wall of the first slot 233 to drive the copper bar 33 out of the first through hole 231. The worn-out part of copper bar 33 is cut off while the remaining part is affixed to the connector of the connecting line, so that the hard disk body 11 can be connected to the connector of the connecting line again.

Furthermore, a friction block 333 is fixedly connected to the L-shaped end of the copper bar 33 for enhancing the connective stability of the copper bar 33 and the interface of the hard disk body 11. In use, when the interface of the hard disk body 11 stretches into the first through hole 231, the friction block 333 on the copper bar 33 is forced to press down on and rub against the interface of the hard disk body 11, which does not cause the wear and tear of the interface of the hard disk body 11 but enhance the connective stability of the friction block 333 and the interface of the hard disk body 11.

The interface of the hard disk body 11 wears out after a frequent use, as a result, the stable connection between the interface of the hard disk body 11 and the connector of the connecting line can be affected. To this end, an interface extension board 23 is arranged at the interface of the hard disk body 11 as a replacement of the interface. When the hard disk body 11 is not placed inside the protective case 21, the first through hole 231 of the interface extension board 23 will be blocked by the dust board 3 for dust prevention. The hard disk body 11 is placed in the protective case 21, during which the interface of the hard disk body 11 is inserted into the first through hole 231 of the interface extension board 23, and an interface end of the hard disk body 11 presses down on the dust board 3, which squeezes the first spring 31 into the first through hole 231 and affixes the copper bar 33 to the interface of the hard disk body 11. To use the hard disk body 11, the connector of the connecting line is simply inserted into the interface extension board 23 and connected to the interface of the hard disk body 11 through the copper bar 33, thus avoiding the wear and tear as well as the unstable connection of the interface of the hard disk body 11 that is directly connected to the connector of the connecting line. When the interface end of the hard disk body 11 presses down on the dust board 3, the dust board 3 will slide along the inner wall of the first through hole 231 to the middle position, the side wall of the third through hole 34 will squeeze one end of the pressing plate 232 upward, making the pressing plate 232 rotate around the hinge point, and then the other end of the pressing plate 232 will move downward to press the copper bar 33 on the interface of the hard disk body 11, so as to enhance the stability between the copper bar 33 and the interface of the hard disk body 11, and avoid the detaching of the copper bar 33 from the interface of the hard disk body 11 due to external vibration. To place the hard disk body 11 in the protective case 21, the hard disk body 11 presses down on the airbag 22 to inject air via the air nozzle 222 by means of the first tube 221, and then the air impacts the interface between the first through hole 231 and the hard disk body 11, blowing the dust off the first through hole 231 and the interface of the hard disk body 11. Now that no dust sticks to the copper bar 33 and the interface of the hard disk body 11, the connective stability of the copper bar 33 and the interface of the hard disk body 11 will be not affected. To make the hard disk body 11 more stable in the protective case 21 and remove it easily, when placing the hard disk body 11 in the protective case 21, the interface of the hard disk body 11 is inserted into the first through hole 231 of the interface extension board 23; at the same time, the threaded rod 42 is controlled to rotate downward on the first plate 41 and press down on the trapezoidal block 43 which then presses down on the push plate 44 to squeeze the hard disk body 11 into the protective case 21. When the protective case 21 is subjected to external vibration, the airbag 22 in the protective case 21 will buffer part of the destructive force, and then cooperate with the push plate 44 to further squeeze the hard disk body 11 into the protective case 21, thus preventing the disconnection between the interface of the hard disk body 11 and the copper bar 33. In use, the copper bar 33 of the interface extension board 23 repeatedly rubs against the connector of the connecting line; as a result, the copper bar 33 may not be effectively connected to the connector. For this reason, the worn-out part of the copper bar 33 shall be cut off before the copper bar extends out of the first through hole 231. The push plate 44 presses down on the hard disk body 11 to make the interface end on the hard disk body 11 squeeze the support plate 331. The bumps 332 on the support plate 331 then slide along the inner wall of the first slot 233 to drive the copper bar 33 out of the first through hole 231. The worn-out part of copper bar 33 is cut off while the remaining part is affixed to the connector of the connecting line, so that the hard disk body 11 can be connected to the connector of the connecting line again. In use, when the interface of the hard disk body 11 stretches into the first through hole 231, the friction block 333 on the copper bar 33 is forced to press down on and rub against the interface of the hard disk body 11, which does not cause the wear and tear of the interface of the hard disk body 11 but enhance the connective stability of the friction block 333 and the interface of the hard disk body 11.

The basic principles, main features and advantages of the present invention are shown and described above. However, one of ordinary skill in the art should understand that the embodiments and the specification are intended to illustrate the principles of the present invention, but should not be construed as a limit thereto. Various variations and improvements can be made without departing from the spirit and scope of the present invention, all of which should fall within the protection scope as claimed in the present invention. The protection scope as claimed in the present invention is defined by the appended claims and their equivalents.

What is claimed:

1. A hard disk device based on blockchain, comprising a storage unit (1) and a protection unit (2); wherein the storage unit (1) comprises a hard disk body (11) used for storing information on the blockchain and arranged in the protection unit (2); the protection unit (2) comprises a protective case (21), an airbag (22) and an interface extension board (23); the airbag (22) is laid flat on the inner bottom of the protective case (21) and affixed to the hard disk body (11) from above; the side wall of the hard disk body (11) in the length direction is affixed to the inner side of the protective case (21), and an interface thereon is inserted into the interface extension board (23); the interface extension board (23) passes through a side wall of the protective case (21) and is bolted to the protective case (21); when the hard disk body (11) is not placed in the protective case (21), a first through hole (231) is made on the interface extension board (23) to accommodate a dust board (3) that is arranged close to the hard disk body (11); the dust board (3) is connected to the inside of the first through hole (231) by a first spring (31); a plurality of second through holes (32) are made on the dust board (3) and interspersed with copper bars (33), one end of the copper bars (33) is shaped into a letter "L", and both ends thereof are located at two ends of the interface extension board (23), respectively; and the hard disk body (11) is protected from dust through the cooperation between the protection unit (2) and the dust board (3);

an arc-shaped pressing plates (232) are arranged in the first through hole (231), with the number of pressing plates (232) the same as that of the copper bars (33); one end of the pressing plates (232) is located at the L-shaped end of the copper bars (33), the middle position thereof is hinged to the side wall of the first through hole (231), and the pressing plates (232) pass through a third through hole (34) formed on the dust board (3); and the connective stability of the copper bars (33) and the interface of the hard disk body (11) is further enhanced through the cooperation between the pressing plates (232) and the dust board (3);

a first tube (221) is installed in the airbag (22) and the outlet end thereof is connected to a plurality of air nozzles (222) that are fixedly connected to one end of the hard disk body (11) close to the interface extension board (23) in a row, and extend into the first through hole (231) through the interface extension board (23); the copper bars (33) inside the first through hole (231) and the interface of the hard disk body (11) are dedusted through the cooperation between the airbag (22), the first tube (221) and the air nozzles (222).

2. The hard disk device based on blockchain according to claim 1, comprising that a fastening unit (4) is arranged opposite to the interface extension board in the protective case (21), and comprises a first plate (41), a threaded rod (42), a trapezoidal block (43) and a push plate (44); two ends of the push plate (44) are embedded into a sliding block (211) arranged on the side wall of the protective case (21), one side face of the push plate (44) is connected to one end of the sliding block (211) through a second spring (212), and the other side face thereof is affixed to an inclined surface on the trapezoidal block (43); one end of the threaded rod (42) is hinged to the upper end face of the trapezoidal block (43), the other end thereof passes through the first plate (41) fixedly connected to the side wall of the protective case (21), and the threaded rod (42) is in threaded connection with the first plate (41); and the hard disk body (11) is further fastened in the protective case (21) by the fastening unit (4).

3. The hard disk device based on blockchain according to claim 1, wherein the copper bars (33) are affixed to a support plate (331), and bumps (332) are arranged on the front and rear side walls of the support plate (331) and embedded into a first slot (233) opened on the side wall of the first through hole (231); and the copper bars (33) extend out of the interface extension board (23) through the cooperation between the support plate (331), the bumps (332) and the first through hole (231).

4. The hard disk device based on blockchain according to claim 3, comprising a friction block (333) is fixedly connected to the L-shaped end of the copper bars (33) for enhancing the connective stability of the copper bars (33) and the interface of the hard disk body (11).

\* \* \* \* \*